(12) United States Patent
Cole et al.

(10) Patent No.: US 7,200,640 B1
(45) Date of Patent: Apr. 3, 2007

(54) CONTINUOUSLY TUNABLE, GRAPHIC INTERNET NAVIGATION TOOL

(76) Inventors: James M. Cole, 10846 Gambrill Park Rd., Frederick, MD (US) 21702; Mark Donnelly, 7313 Abington Ct., Frederick, MD (US) 21702; Medea E. Minnich, 103 Baughman's La. - #199, Frederick, MD (US) 21702; William H. Humm, 8603 Woodlake Dr., Richmond, VA (US) 23294

( * ) Notice: Subject to any disclaimer, the term of this patent is extended or adjusted under 35 U.S.C. 154(b) by 0 days.

(21) Appl. No.: 09/577,167

(22) Filed: May 24, 2000

Related U.S. Application Data

(60) Provisional application No. 60/189,929, filed on Mar. 16, 2000.

(51) Int. Cl.
*G06F 17/30* (2006.01)

(52) U.S. Cl. ............ 709/217; 709/224; 345/733; 345/738; 707/10

(58) Field of Classification Search ......... 709/203, 709/217, 218, 223; 707/10; 345/733, 738
See application file for complete search history.

(56) References Cited

U.S. PATENT DOCUMENTS

| | | | |
|---|---|---|---|
| 5,369,577 A * | 11/1994 | Kadashevich et al. | 704/9 |
| 5,572,643 A | 11/1996 | Judson | 395/793 |
| 5,659,729 A | 8/1997 | Nielsen | 395/603 |
| 5,918,012 A | 6/1999 | Astiz et al. | 395/200.47 |
| 5,956,711 A * | 9/1999 | Sullivan et al. | 707/6 |
| 5,978,841 A | 11/1999 | Berger | 709/217 |
| 5,982,369 A * | 11/1999 | Sciammarella et al. | 345/835 |
| 6,018,768 A | 1/2000 | Ullman et al. | 709/218 |
| 6,021,426 A | 2/2000 | Douglis et al. | 709/200 |
| 6,023,701 A | 2/2000 | Malik et al. | 707/10 |
| 6,035,330 A | 3/2000 | Astiz et al. | 709/218 |
| 6,205,552 B1 * | 3/2001 | Fudge | 713/201 |
| 6,282,549 B1 * | 8/2001 | Hoffert et al. | 707/104 |
| 6,314,094 B1 * | 11/2001 | Boys | 370/352 |
| 6,360,215 B1 * | 3/2002 | Judd et al. | 707/3 |
| 6,442,549 B1 * | 8/2002 | Schneider | 707/10 |

OTHER PUBLICATIONS

Jinxi Xu, W. Bruce Croft, "Query Expansion Using Local and Global Document Analysis", Annual ACM Conf. on Research and Dev. in Information Retrieval, 1996, pp. 4–11.*

"Angry IP Scanner", Internet www.angryzilber.com/ipscan ,Date unknown, Retrieved Jul. 29, 2004.*

"Method of Information Retrieval Based on Collocation," IBM TDB Jul. 1996, v.39 Iss 7 pp. 225–226.*

* cited by examiner

*Primary Examiner*—Dung C. Dinh
(74) *Attorney, Agent, or Firm*—Larry J. Guffey

(57) ABSTRACT

The present invention discloses a system and method of searching, exploring or otherwise navigating the contents of a collection of networked documents or pages. In a preferred embodiment, this system provides a user with a multimedia display format which intuitively indicates, without the user opening a document or web page, the characteristics of the document or web pages. Additionally, this system permits a user to move between such documents without extensively entering explicit search terms. With this system, the contents of Internet web pages may be evaluated by incrementally adjusting through a multimedia display of a continuum of IP addresses or a continuum of related web pages, which are identified as having keywords that match any of a collection of keywords generated from an initially-inputted keyword. This system further comprises a dial or rotary control that allows the user to select, in a continuous fashion, among such displayed, Internet web pages.

7 Claims, 11 Drawing Sheets

= SECURE SITE

= SECURE SITE

TEXT = TEXT AVAILABLE

= PICTURE AVAILABLE

F = FTP SITE

? = UNKNOWN

CONTINUOUSLY TUNABLE, GRAPHIC INTERNET NAVIGATION TOOL

CROSS-REFERENCE TO RELATED APPLICATIONS

This application is related to the following U.S. Provisional Patent Application: Application No. 60/189,929, filed Mar. 16, 2000, entitled "Continuously Tunable Graphic Internet Navigation Too," by applicants James Cole, Medea Minnich, and Mark Donnelly. The teachings of this application are incorporated herein by reference to the extent that they do not conflict with the teaching herein.

BACKGROUND OF THE INVENTION

1. Field of the Invention

The present invention relates to data processing systems and methods that use interconnected networks. More particularly, this invention relates to a system and method for providing a continuously tunable, graphic Internet navigation tool.

2. Description of the Related Art

In the past decade there has been an explosive growth in the use of the globally-linked network of computers known as the Internet. This growth has been fueled, in large part, by the introduction and widespread use of so-called "web" browsers, such as Internet Explorer (provided as part of the Windows operating system from the Microsoft Corporation), or the Navigator program available from EarthLink, Inc. Such browsers allow for simple graphical user interface (GUI)-based access to network servers, which support documents formatted as so-called "web pages".

The "World Wide Web" (WWW) is that collection of servers of the Internet that utilize the Hypertext Transfer Protocol (HTTP). HTTP is a known application protocol that provides users access to files (which can be in different formats such as text, graphics, images, sound, video, etc.) using a standard page description language known as Hypertext Markup Language (HTML).

HTML provides basic document formatting and allows the developer to specify "links" to other servers and files. Use of an HTML-compliant client browser involves specification of a link via a Uniform Resource Locator or "URL" (e.g., www.census.gov). Upon such specification, the client makes a request to the server identified in the link and receives a "web page" (namely, a document formatted according to HTML) in return.

According to the networking protocol for the WWW (i.e., TCP/IP networking protocol), each URL has an associated numeric, Internet Protocol (IP) address. The IP address denotes both the server machine, and the particular file or page on that machine. Meanwhile, the URL functions as a mnemonic from the user's standpoint, offering generally some degree of sensible correlation with the page's identity.

Associated with the WWW are a number of web server sites functioning as "search engines" which provide access to indexed (e.g., web page creator supplied keywords) information to locate web pages that are of interest to a user. In general, these search engines search large, proprietary databases for matches against a set of user supplied keywords. A list of web pages which match the user's supplied keyword search is then returned to the user's web browser. The list of matching web pages is presented by the web browser program on the user's computer display as a list of links to the matching web pages. The user, in order to discover the nature or characteristic of the resulting links, must open the web page and examine it, often requiring several stages of time-consuming, link tracing to make a determination as to the value of the result.

While this method is adequate in many instances where explicit keyword terms are available, specifically where well-defined searches are undertaken, it does not provide the user with any of the intuitive or associative information relating to a particular search. Additionally, this method does not provide well for an exploratory mode of database searching in which the searcher is just generally searching and reacts by temporarily suspending the search when he/she comes across a particular site of interest; as, for example, one does in tuning a radio receiver to search until a radio station of interest is found.

Further contrasting the typical Internet search with a broader, more exploratory type of searching, it is seen that, in the typical Internet search, the user must first enter explicit keyword information, then observe the results of that search (generally a list of possible website containing the keyword), then individually inspect various of the listed websites to determine their relevance to the searcher's interests. Meanwhile, in the exploratory, radio tuning situation, a searcher may tune continuously through the given radio spectrum, and is presented with audible cues to the nature of the program content at each station. This searcher may then easily skip radio stations that are of no interest, with little time investment in further examining such stations.

From this comparison, it can be noted that the prior art of WWW database searching does not extend to include this type of exploratory searching. Although so-called "artificial intelligence" techniques have variously been applied to Internet search methods, they do not, in general, present the user with a significant departure from traditional search methods in which the search output is a list of potential sites of interest.

A key means for attempting to increase the efficiency of WWW keyword. searching is the use of meta-tags. Meta-tags are a kind of instruction to the computer reading a web page. They always go in the header (between the <head> tags) of a page. The use of meta-tags can provide web page creators with a means to retain some control over how their page is indexed in the various search engine databases. For example, meta-tags may be chosen for their value in characterizing a web page more generally than a singular keyword. However, even with such choices, the overall effectiveness of meta-tags for searching purposes still appears to be limited by the fact that current WWW browsers do not generally permit a wide range of meta-tag format and content.

The WWW constitutes an unusual database that differs greatly from those upon which the original browsing or searching techniques were developed. The WWW is extraordinarily vast and varied it is certainly not focused or constrained by any enterprise's subjects of interest.

When a database is relatively constrained in its content, for example, when it has been created by a manufacturer to track its inventory, it is useful and customary for the database user to rely upon explicit search terms, and the user generally expects similarly constrained results. However, on the WWW, users' interests and search purposes cover a vast range, and a user's foreknowledge regarding appropriate search terms or likely results is likely to be much vaguer. This suggests the need for WWW search methods that do not require the inputting of keywords.

The prior art of searching for specific web pages generally involves the use of names or URL's rather than the numeric IP address. This is done both for convenience and due to the lack of appropriate navigation tools that might exploit the value of using, in some instances, the numeric address.

Manipulation of IP addresses for the purpose of mapping a network of computers has been used. In such cases, the objective has usually been to produce a comprehensive overview of the nature and extent of various pages on the network, thereby forming a "map" of the network. Such exercises represent long-term and relatively static applications of direct IP address manipulation, and a client or user does not directly control the address manipulation. Nonetheless, IP address manipulation, or "IP tuning," appears to offer an opportunity for broad Internet exploration, if such a technique could be coupled with an appropriate user interface.

Thus, there exists a need to provide a WWW user and searcher with a navigation tool which more fully accommodates the vastness of the WWW, and which permits a searcher to comprehend more fully the potential results of his/her search efforts.

SUMMARY OF THE INVENTION

The present invention is generally directed to satisfying the needs set forth above and overcoming the limitations and problems identified with prior WWW navigation tools.

In accordance with one preferred embodiment, the present invention's improvements to a basic client-server system are seen to comprise: (a) means for generating a plurality of related keywords in response to a user-entered keyword, and inputting these keywords to a search engine for identification and retrieval of the web page characterizing information for those web pages having stored, indexed information which matches the inputted keywords, (b) means for utilizing the retrieved, web page characterizing information to generate multi-media expressions for each of these web pages, wherein these expressions allow a user to understand the contents of these web pages without the user having to open the web pages, (c) means for utilizing the retrieved, web page characterizing information to generate and display a plurality of icons representative of these web pages, wherein when a user selects a specific icon, the multimedia expressions associated with that icon and web page are communicated to the user, and (d) means for allowing a user to turn a dial that effectively provides the user with the capability to continuously move thru these displayed icons and their understanding-providing, multi-media expressions so as to efficiently tune to those web pages of interest.

In accordance with another preferred embodiment, the present invention's improvements to a basic client-server system are seen to comprise: (a) means for generating a plurality of IP addresses based upon an initial, user-inputted IP address, (b) means for directing the retrieval from a network server of stored, indexed information pertaining to the IP addresses, (c) means, utilizing said retrieved information, for generating multi-media expressions for each of the IP addresses which allows a user to understand the contents of the web pages associated with the IP addresses without a user having to open the web pages, (d) means, utilizing the retrieved information, for generating and displaying a plurality of icons representative of the IP addresses, wherein when a user selects an icon, the multimedia expressions are communicated to the user, (e) means for allowing a user to turn a dial that effectively provides the user with the capability to continuously move thru these displayed icons and their understanding-providing, multi-media expressions so as to efficiently tune to those web pages of interest.

The present invention is seen to overcome the limitations of the prior art by providing the Internet user an easy, intuitive means for searching and, importantly, more broadly exploring the WWW. This present invention provides a user with a suggestive, multimedia representation of WWW search and exploration opportunities, without the traditional "list" results common to other Internet navigation tools.

It is therefore an object of the present invention to provide a method and system for navigating the Internet that overcome the limitations and problems identified with prior methods and systems.

It is another object of the present invention to meet the need in this field for an interactive, Internet navigation tool which requires less user foreknowledge regarding appropriate search terms or likely search results.

It is a yet another object of the present invention to provide a method and system for navigating the Internet that will yield greater user satisfaction.

It is a further object of the present invention to provide a method and system for navigating the Internet that will enhance a user's searching and navigation efficiency.

These and other objects and advantages of the present invention will become readily apparent as the invention is better understood by reference to the accompanying drawings and the detailed description that follows.

DESCRIPTION OF THE PREFERRED EMBODIMENT

Figure 1:
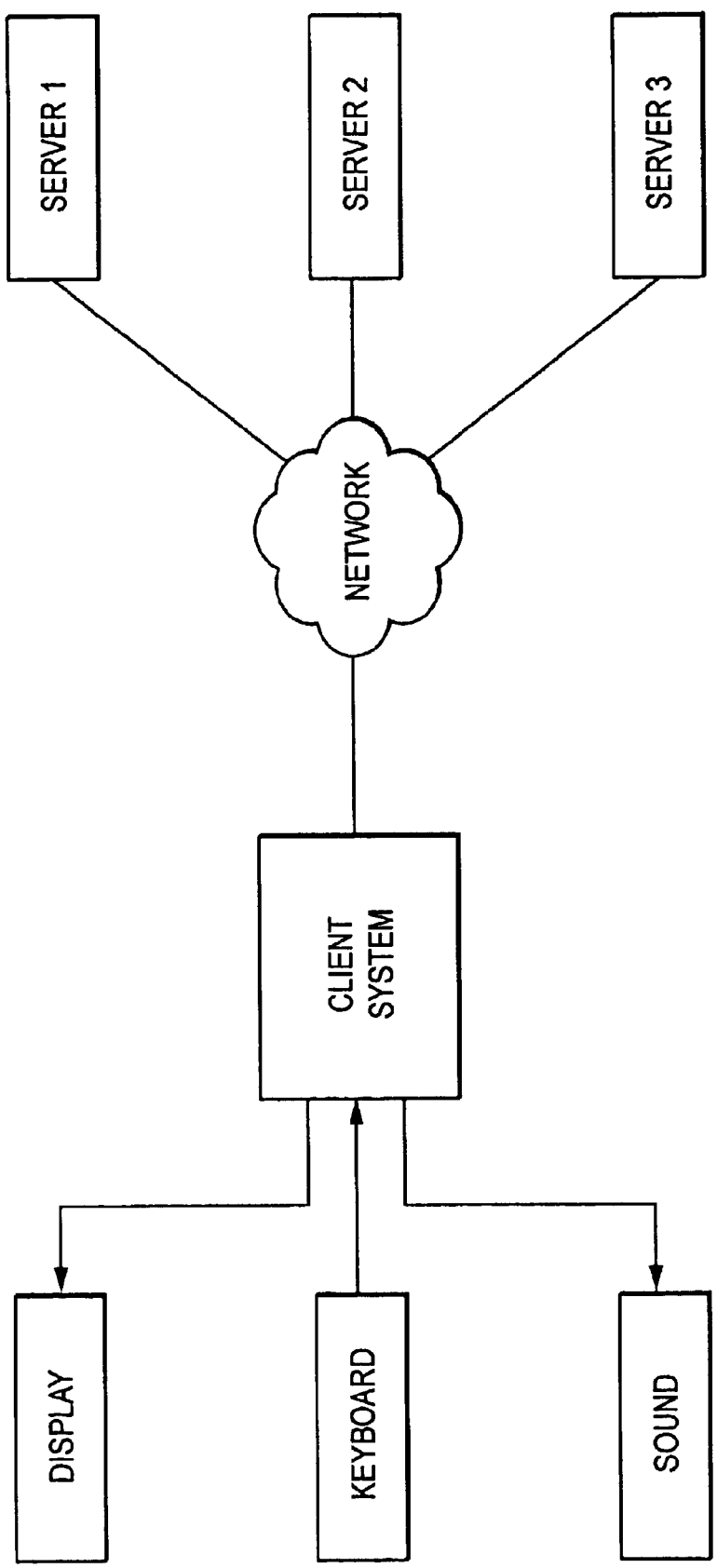
FIG. 1 illustrates a computer network in which the present invention may be implemented

For purposes of explanation and not limitation, specific details are set forth below, such as specific software engines, software interfaces, display features, and control procedures, in order to provide a thorough understanding of the present invention. However, it will be apparent to one skilled in the art that the present invention may be practiced in other embodiments that depart from these specific details. In other instances, detailed descriptions of well known methods, hardware devices, network protocols, operating system platforms, etc. are omitted so as not to obscure the description of the present invention with unnecessary detail.

Additionally, it should be understood that the present invention may be applied to any navigation application on any type of network including public networks such as the Internet and private networks such as a network accessible only by a certain company's employees, etc. Thus, for example, both Internet web sites and Intra-Nets web sites can be effectively navigated using the present invention. Reference to the Internet throughout the description therefore is meant only as a convenient, non-limiting example of a network.

Referring now to the drawings wherein are shown preferred embodiments and wherein like reference numerals designate like elements throughout, there is shown in these drawings the various aspects of a continuously tunable, graphic Internet navigation system and method.

As represented in FIG. 1, the Internet is a known computer network based on the client-server model. Conceptually, the Internet comprises a large network of servers which are accessible by clients, typically users of personal computers, through some private Internet access provider (e.g., Internet America) or an on-line service provider (e.g., America On-Line). Each of the clients may run a browser, which is a known software tool used to access the servers via the access providers. A server operates a so-called "web site" which supports files in the form of documents and web pages. A network path to a server is identified by a URL having a known syntax for defining a network connection.

Figure 2:
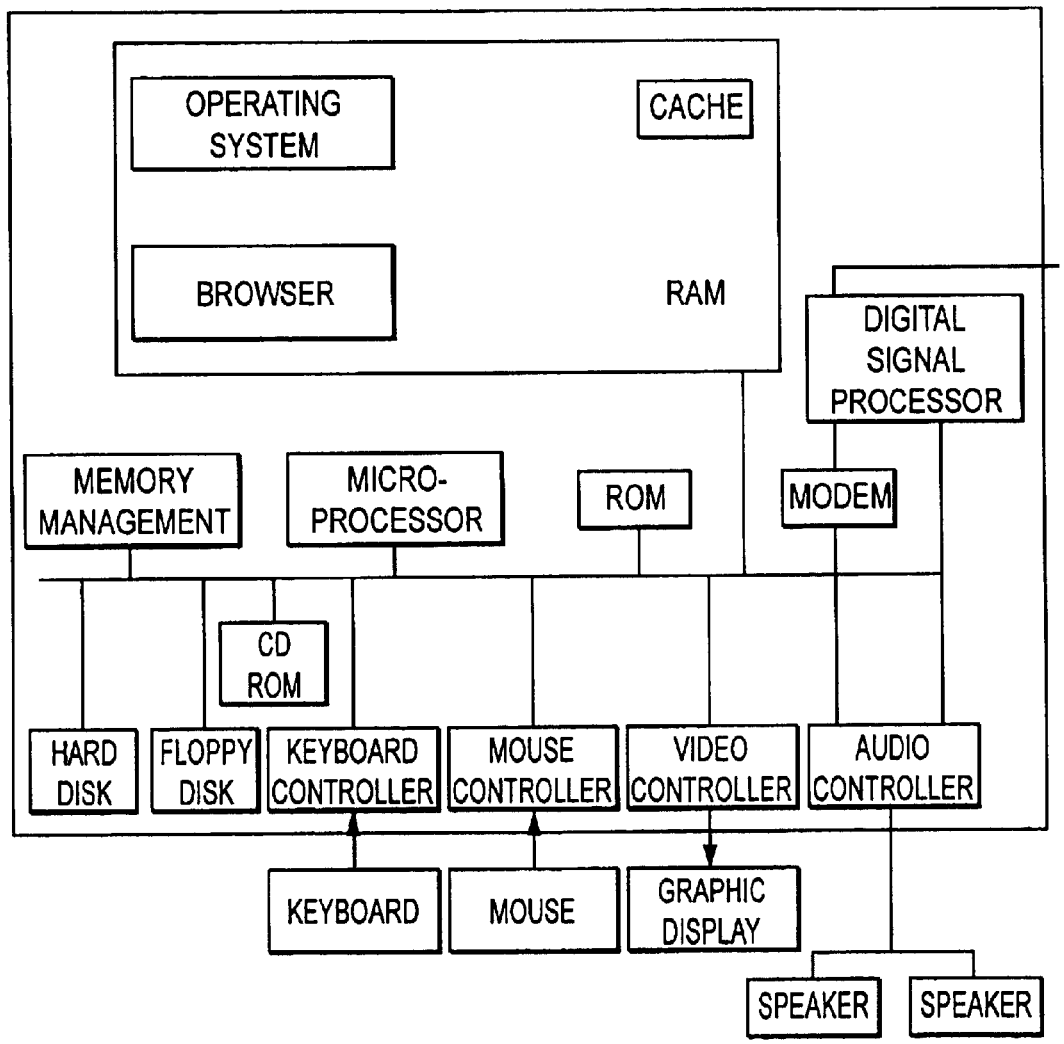
FIG. 2 is a block diagram illustrating a client-side computer system in which the present invention may be implemented.

FIG. 2 shows a block diagram of a representative client-side computer in which the present invention is implemented. Such a computer includes a system bus or plurality of system buses to which various components are coupled and by which communication between the various components is accomplished. The microprocessor or central processing unit (CPU) is connected to the system bus and is supported by read only memory (ROM) and random access memory (RAM) also connected to system bus. The ROM contains among other code the Basic Input-Output system (BIOS) which controls basic hardware operations such as the interaction and the disk drives and the keyboard. The RAM is the main memory into which the operating system and application programs are loaded. The memory management chip is connected to the system bus and controls direct memory access operations including, passing data between the RAM and hard disk drive and floppy disk drive. The CD ROM, also coupled to the system bus, is used to store a large amount of data, e.g., a multimedia program or large database.

Also connected to this system bus are various I/O controllers: the keyboard controller, the mouse controller, the video controller, and the audio controller. The keyboard controller provides the hardware interface for the keyboard, the controller provides the hardware interface for the mouse (or other point and click device), the video controller is the hardware interface for the display, and the audio controller is the hardware interface for multimedia speakers. A modem enables communication over a network to other computers over the computer network.

Implementation of the present invention in the form of an Internet navigation system, may comprise, depending upon which of the various modes of operation of the system is selected, some or all of the following elements: (1) a client-side computer program which presents search results in the form of a panoramic, graphical display of identified web entities, along with various, associated multimedia expressions which serve to provide more information about these entities without a searcher actually having open their web pages, (2) a server-side computer program which optionally generates keyword expansions for entered keywords and couples or interfaces this expansion set to established search engine, input formats, (3) a client-side computer program which selects or generates IP address sequences based upon an initial user input, and couples these address sequences to established browser input formats, and (4) a rotary or other continuously selectable dial for user input of a search selection parameter or manipulation of the graphical display of search results.

Thus, in what will be referred to as its "expanded keyword searching" and "IP tuning" modes of operation, it will seen that the client-side, IP addressing software program and the server-side software program, respectively, are not needed. Thus, the present invention may, in some ways, be considered to be a collection of elements that may be variously configured depending upon the invention's desired mode of operation.

Figure 3:
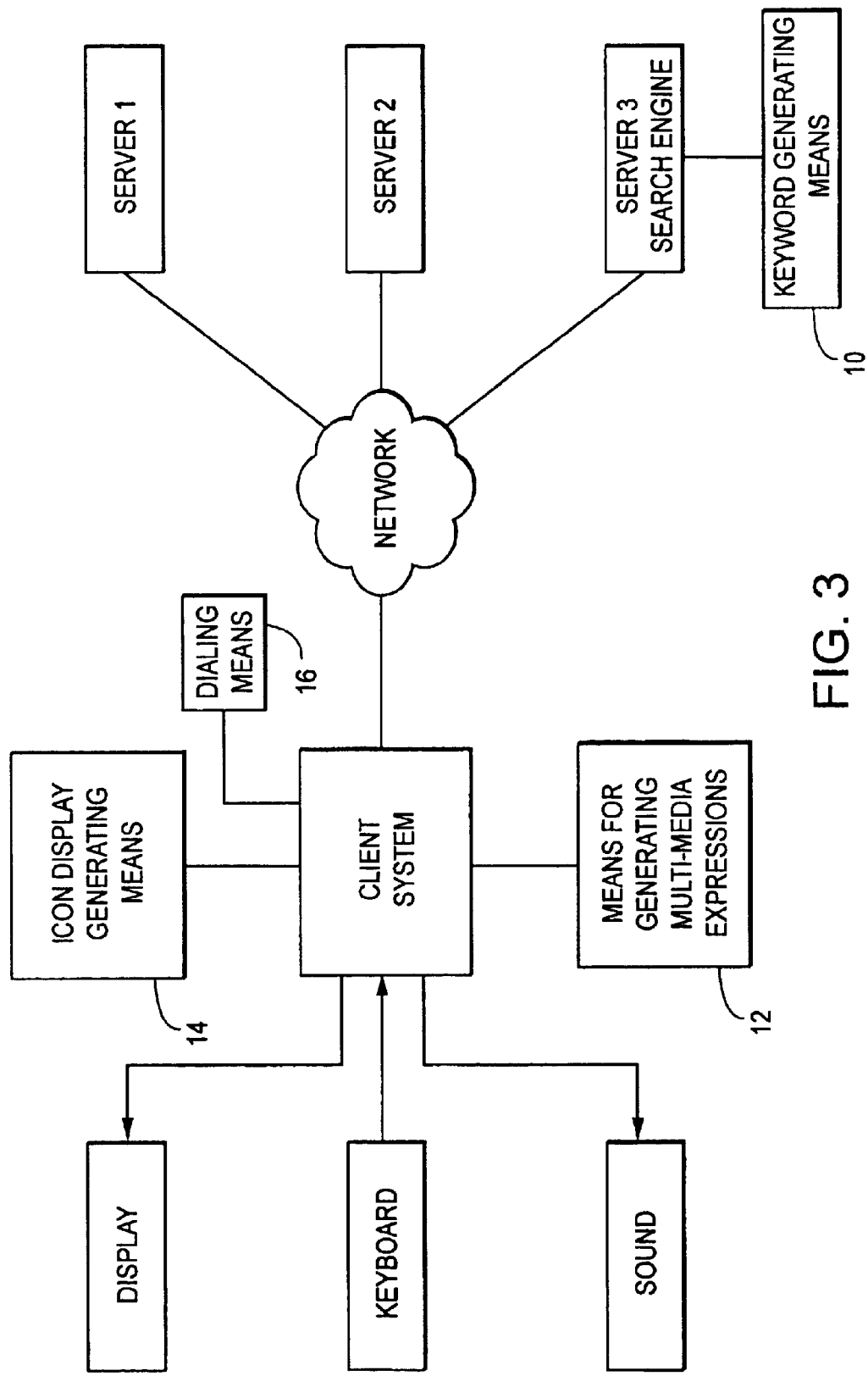
FIG. 3 illustrates an embodiment of the present invention in the form of an improved Internet navigation system operating in an "expanded keyword searching" mode of operation.

FIG. 3 illustrates an embodiment of the present invention in the form of an improved Internet navigation system operating in an "expanded keyword searching" mode of operation. The present invention's improvements to a basic client-server system are seen to comprise: (a) means 10 for generating a plurality of related keywords in response to a user-entered keyword, and inputting these keywords to a search engine for identification and retrieval of the web page characterizing information for those web pages having stored, indexed information which matches the inputted keywords, (b) means 12 for utilizing the retrieved, web page characterizing information to generate multi-media expressions for each of these web pages, wherein these expressions allow a user to understand the contents of these web pages without the user having to open the web pages, (c) means 14 for utilizing the retrieved, web page characterizing information to generate and display a plurality of icons representative of these web pages, wherein when a user clicks-on a specific icon, the multimedia expressions associated with that icon and web page are communicated to the user, and (d) means 16 for allowing a user to turn a dial that effectively provides the user with the capability to continuously move thru these displayed icons and their understanding-providing, multi-media expressions so as to efficiently tune to those web pages of interest.

Figure 4:
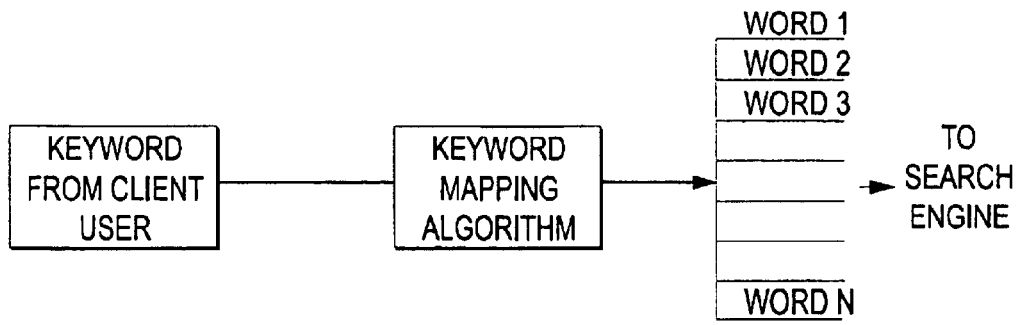
FIG. 4 illustrates the relationship between a user's inputted keyword and the server expansion of the keyword into a greater list of keywords.
Figure 5:
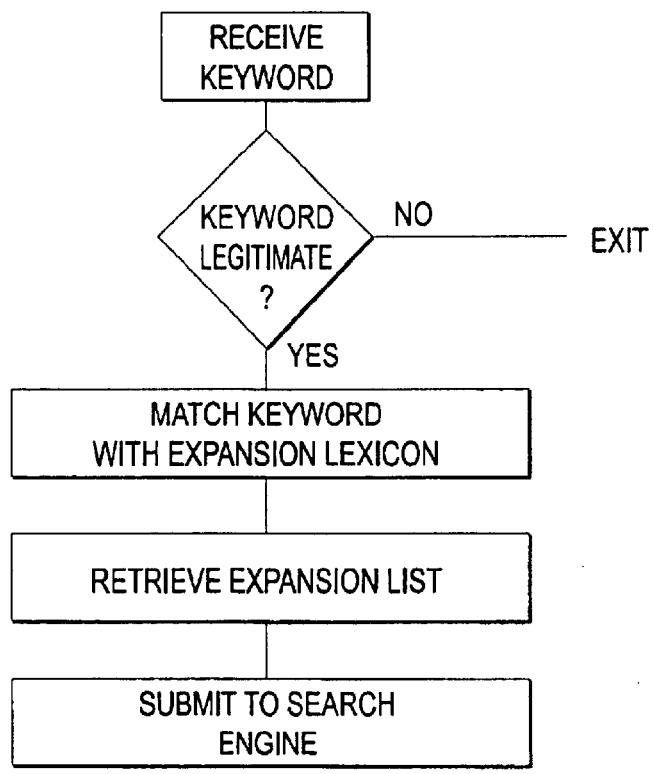
FIG. 5 illustrates a lexicon look-up algorithm appropriate for expanding the keywords based an initial, user-inputted keyword.

An example of the means 10 for generating a plurality of related keywords in response to a user-entered keyword is shown in FIG. 4 which illustrates the relationship between a user's inputted keyword and the server expansion of the keyword into a greater list of keywords based upon a lexicon look-up algorithm, as shown in FIG. 5.

Figure 6:
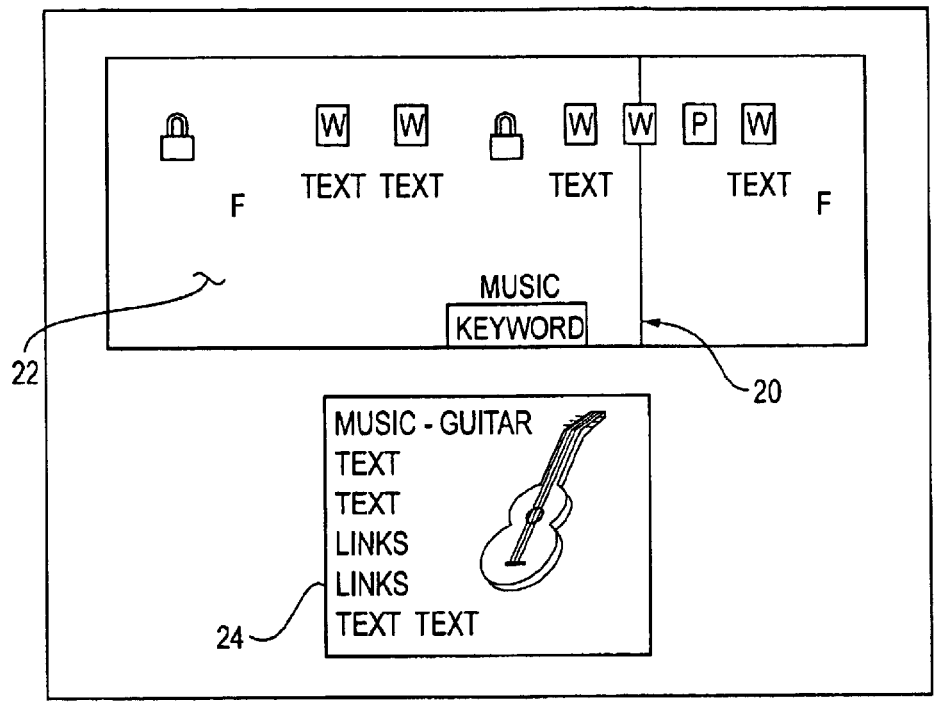
FIG. 6 illustrates a type of graphic display generated by the present invention.
Figure 7:
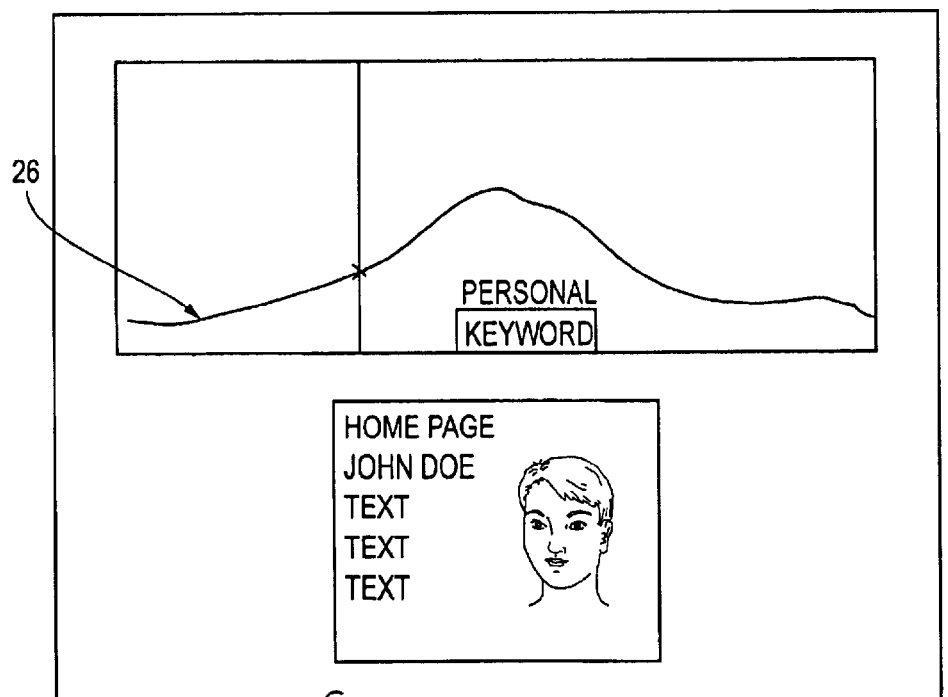
FIG. 7 illustrates an alternative type of graphic display generated by the present invention.

The graphic displays generated by the present invention in this "expanded keyword searching" mode of operation may take many various forms. For illustrative purposes, some of these forms are shown in FIGS. 6-7. These graphic displays are electronically drawn upon the screen of the client-side computer using conventional and well-established graphic display techniques.

Figure 8:
FIG. 8 provides a legend for the icons presented in FIG. 6.
Figure 8:
Figure 8:

FIG. 6 shows a type of graphic display which illustrates a panorama of web entities (e.g., web pages) indicated by icons across the user's monitor screen. A legend for such icons is given by way of example in FIG. 8. Horizontally across the screen are arranged expressions of web entities which have been identified by a search engine as related to, via expansions of the keyword search term, the initial keyword term itself A pointer 20 is a user-movable indicator that selects a specific icon or expression from across the panoramic display 22. In this example, the keyword "music" is used as the launch or seed keyword which is inputted into a search engine. The panoramic display shows a range of web entities that correlate with either the keyword or the expansion set of keywords.

Beneath the horizontal display is a window 24 that depicts in considerably more detail the nature and characteristic of the selected web entity. The details making up the window depiction are culled from either expansion of key terms by the client-side computer, from applets associated with the selected web entity, or from specific data taken from the meta-tags associated with the web entity.

As the user moves the pointer 20 across the panoramic display 22, the window 24 depicts in some detail the web entity and the user may make a judgment as to the interest or relevance to his/her desired search. This judgment may be made without the user having to explicitly open the web page itself Additionally as the pointer 20 is moved across the panorama by the user, sound elements which relate to the key terms, applet, or meta-tags as interpreted or expanded by the client-side software are presented to the user as a further representation of the nature and characteristic of the web entity selected.

In this example, the pointer 20 is shown selecting a particular website from the panorama and the corresponding multimedia expression is depicted in the window 24, in this case showing a guitar icon, which was derived from a meta-tag associated with the website selected. Text and hypertext links are also shown in the window 24. This gives the user an immediate indication of the nature or characteristic of the website without having to open it and drill down through it.

FIG. 7 illustrates another possible manner of presenting keyword search term relevance. In this case, the degree of relevance, extrapolated from keyword occurrence within meta-tags, is presented as a histogram or as a probability distribution curve, 26. This gives the user an intuitive and immediate indication of the extent of relevant web entities that correlate to the given search term. The distribution may be based, for example, upon the number of occurrences of the keyword, the proportion of keyword matches relative to other meta-tags, the completeness of the keyword occurrence, or other parameters.

In this example, the keyword "personal" is the launch or seed keyword, and the window 24 is shown displaying a home page applet with some associated text. The applet is culled from the web site.

Associated with the graphic displays of the present invention is a means 16 (e.g., a dial or rotary selector) that permits a user to move between the various search and exploration opportunities presented by the present invention. While the same functionality may be implemented by a standard, computer mouse, the intuitive and continuous nature of the display format is enhanced by a continuous-motion dial or linear selector.

Figure 9:
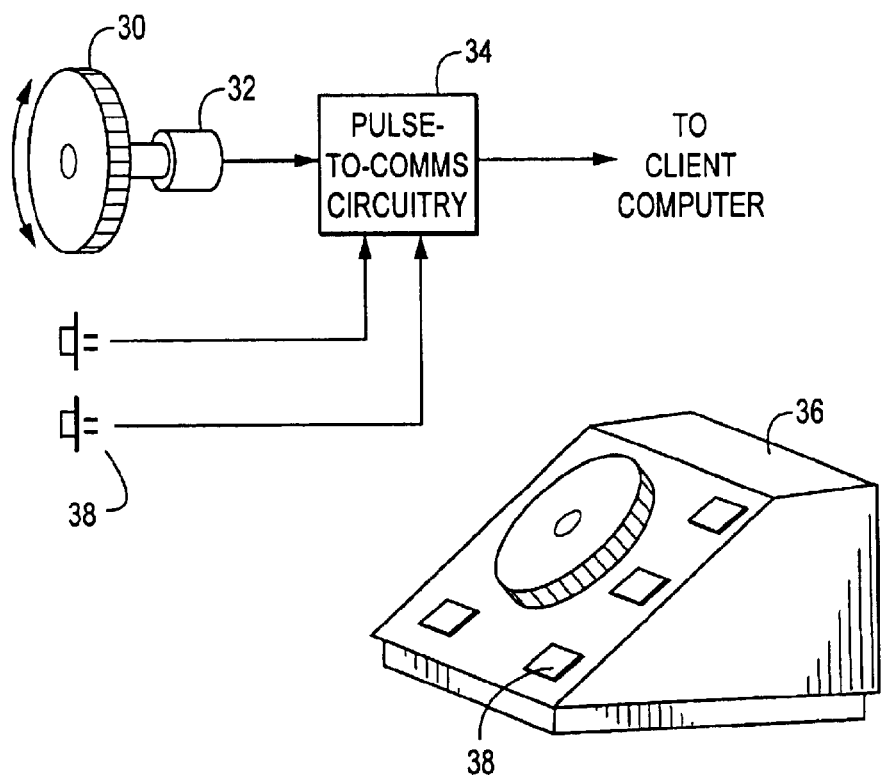
FIG. 9 illustrates the essential features of a linear dial mechanism that may be used as part of the present invention.

FIG. 9 illustrates the essential features of such a linear dial mechanism that may be used as part of the present invention. Knob 30 is a manually controlled rotary selector that is mechanically coupled to, in the embodiment shown, an optical encoder 32. Circuitry 34 is included which converts this encoded pulse stream to a communication protocol similar to or compatible with a computer mouse such that the client computer may use the dial position input from the user to position the apparent position of the pointer 20. A representative illustration of the overall mechanism is shown by 36. Various pushbuttons 38 are included to permit the user to perform selections apart from the rotary dial, such as zooming, skipping, and marking web entities shown on the panoramic display.

The present invention is seen to overcome the limitations of the prior art by providing the Internet user an easy, intuitive means for searching and, importantly, more broadly exploring the WWW. This present invention provides a user with a suggestive, multimedia representation of WWW search and exploration opportunities, without the traditional "list" results common to other Internet navigation tools.

Such multimedia expressions provide a user with clues or indicators as to the nature or characteristics of the related web pages or other web entities. These clues or indicators are automatically presented to a user without the user having to explicitly open a given web page. Such clues are created within a user's computer by converting or extrapolating identifying features of a web page (e.g., meta-tags) so as to present information regarding the web page as icons, sounds, and applets to help reveal to the user the nature of the web page.

In what is identified herein as its "IP tuning" mode of operation, the present invention provides a means for finding Internet entities or websites by a user's manipulation of the IP addresses used by the associated browser. By incrementally modifying an initially inputted IP address, a user is able to select and further observe the characterizing information of those web pages having IP addresses which differ only incrementally from that of the initially inputted IP address. Again, the graphic display of a user's computer communicates this characterizing information as multimedia expressions which are similar to the previously described graphic display, except that in this mode (IP tuning) there is not expected to be functional or other relationship between the displayed web pages.

Since under TCP/IP networking protocol, Internet addresses are numbered using four-byte sequences or "dotted quad" in which each network node or web entity has a unique numeric address and wherein these addresses may be arranged to some extent such that specific bytes of the four-byte address relate to sub networks, the IP tuning capability of the present invention permits a user to select portions of the four-byte address field to manipulate, in a sense analogous to course and fine tuning.

In this mode of operation, the present invention provides a means for a user to initiate an automatic linear scanning or randomized IP address selection. In this manner, a user may search or explore the WWW without the constraint of having to have sufficient knowledge of desired search results so as to be able to enter appropriate keywords.

Figure 10:
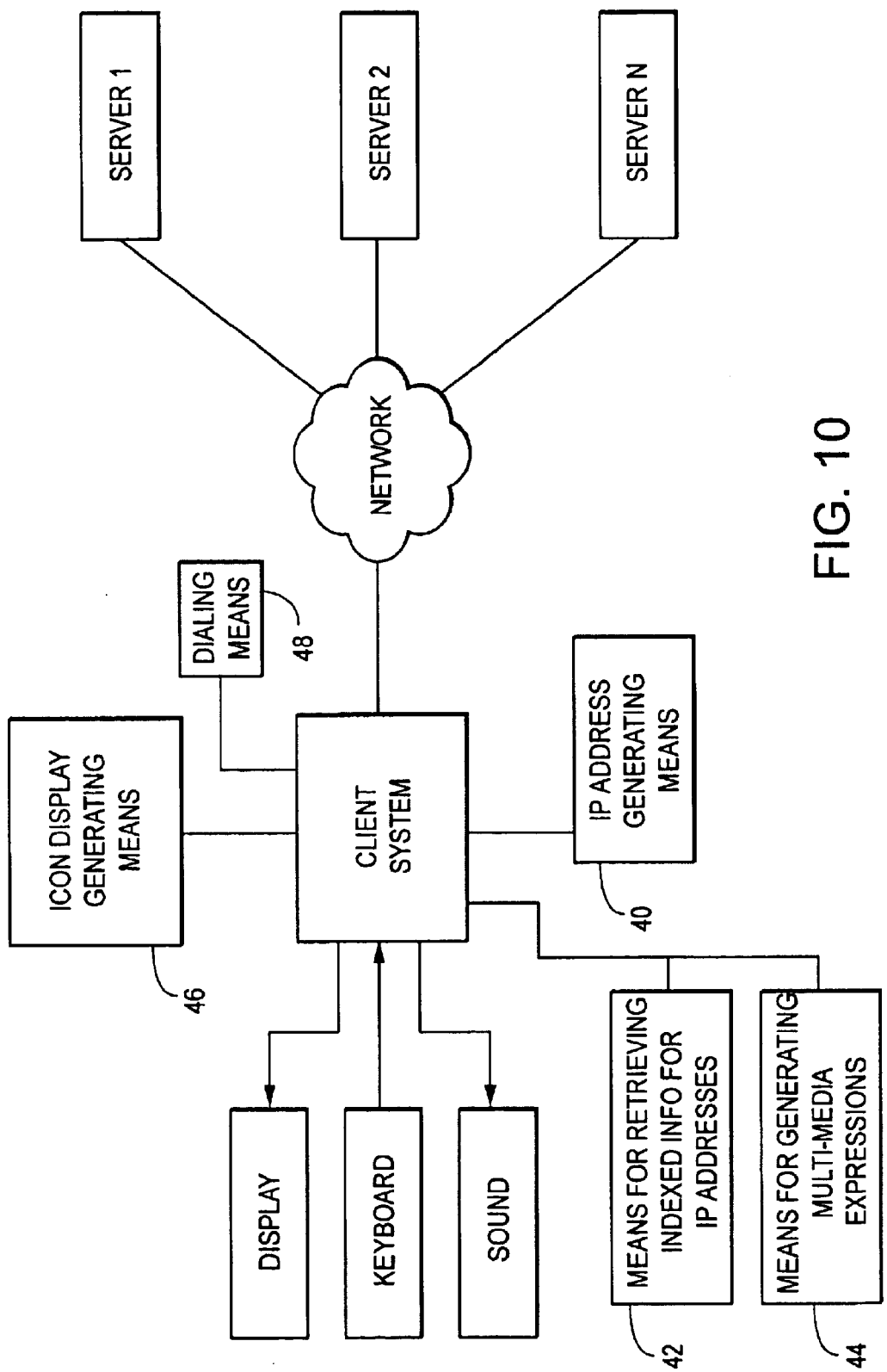
FIG. 10 illustrates an embodiment of the present invention in the form of an improved Internet navigation system operating in an "IP tuning" mode of operation.

FIG. 10 illustrates an embodiment of the present invention in the form of an improved Internet navigation system operating in an "IP tuning" mode of operation. The present invention's improvements to a basic client-server system are seen to comprise: (a) means 40 means for generating a plurality of IP addresses based upon an initial, user-inputted IP address, (b) means 42 for directing the retrieval from a network server of stored, indexed information pertaining to the IP addresses, (c) means 44, utilizing said retrieved information, for generating multi-media expressions for each of the IP addresses which allows a user to understand the contents of the web pages associated with the IP addresses without a user having to open the web pages, (d) means 46, utilizing the retrieved information, for generating and displaying a plurality of icons representative of the IP addresses, wherein when a user clicks-on an icon, the multimedia expressions are communicated to the user, (e) means 48 for allowing a user to turn a dial that effectively provides the user with the capability to continuously move thru these displayed icons and their understanding-providing, multi-media expressions so as to efficiently tune to those web pages of interest.

Figure 11:
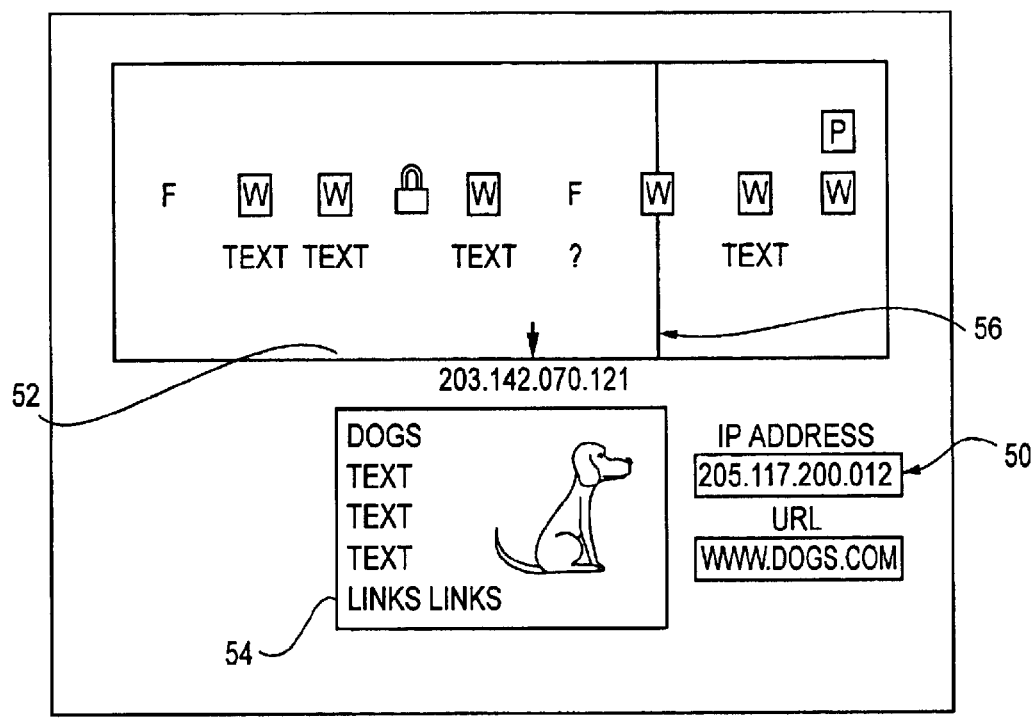
FIG. 11 illustrates a type of graphic display generated by the present invention.

FIG. 11 illustrates a manner of presenting a panorama of web entities when the invention is operated in this "IP tuning" mode of operation. In this case, the base IP address is shown in window 50, while the range of IP addresses in the panorama is indicated by indices 52 along the horizontal axis of the display. In this case, as in the previous examples, a window 54 is displayed that is associated with the panoramic display to give the user a more detailed depiction of the nature or characteristic of the selected web entity.

As the pointer 56 is moved across the panorama by the user, sound elements, which relate to the key terms, applet, or meta-tags as interpreted or expanded by the client-side software, are presented to the user as a further representation of the nature and characteristic of the web entity selected. In this example, no keyword is required for launch, but rather the mechanism for web page selection is through direct IP address manipulation. Base addresses are entered via a keyboard, then incrementally adjusted by means of a rotary dial or mouse direction controls.

It should also be recognized that a further embodiment of the present invention can take the form of methods for enabling a computer user to navigate the Internet.

Figure 12:
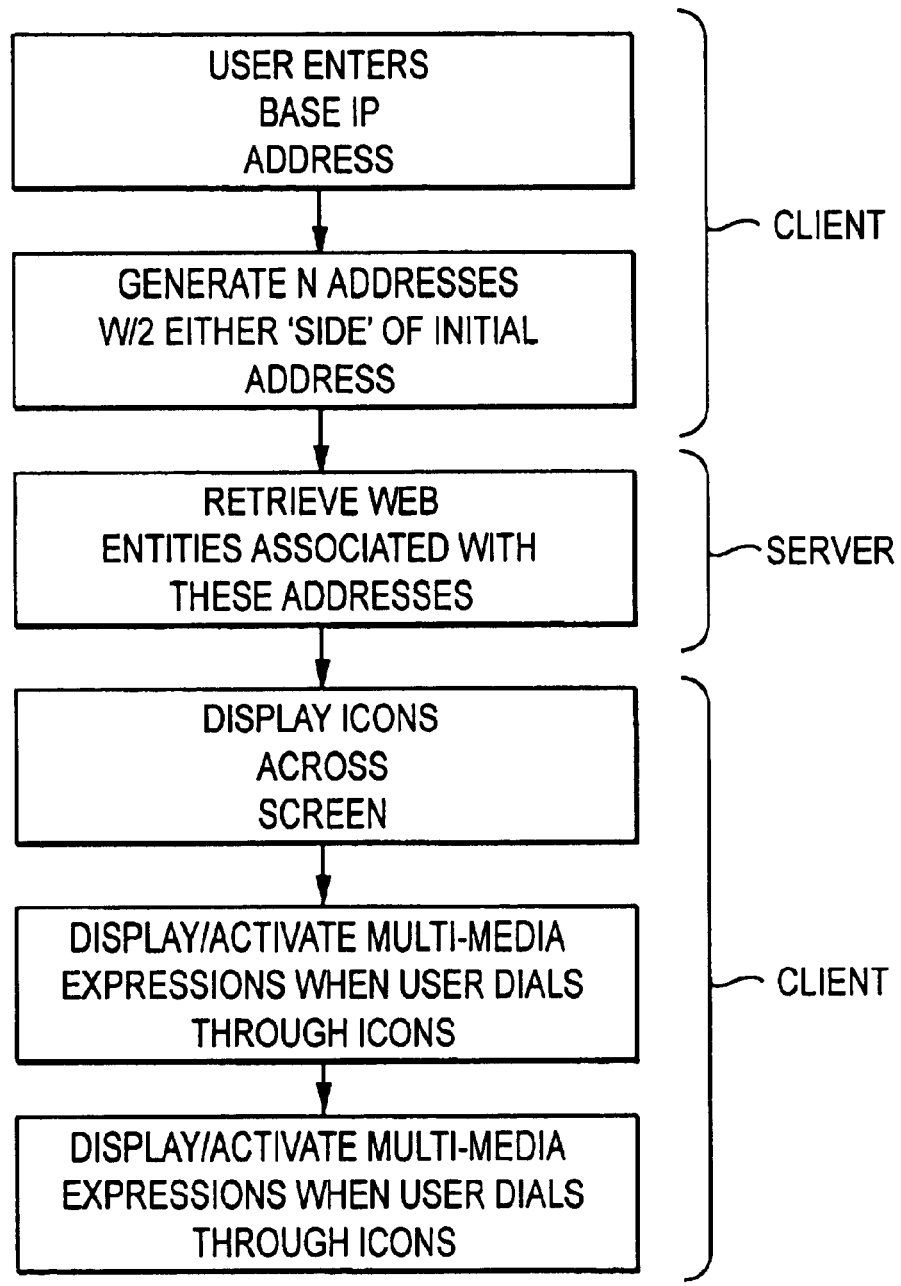
FIG. 12 illustrates the flow diagram for an "IP tuning" method of Internet navigation.

The flow diagram for such an "IP tuning" method is shown in FIG. 12 and is seen to comprise the steps of (a) generating a plurality of IP addresses based upon an initial, user-inputted IP address, (b) directing the retrieval from a search engine server of indexed information pertaining to each of the generated IP addresses, (c) generating, utilizing the retrieved information, multi-media expressions for each of the generated IP addresses, (d) generating and displaying, utilizing the retrieved information, a plurality of icons, each of which is representative of one of the generated IP addresses, and (e) communicating at least one of the multimedia expressions to the user when the user selects a specific icon.

Figure 13:
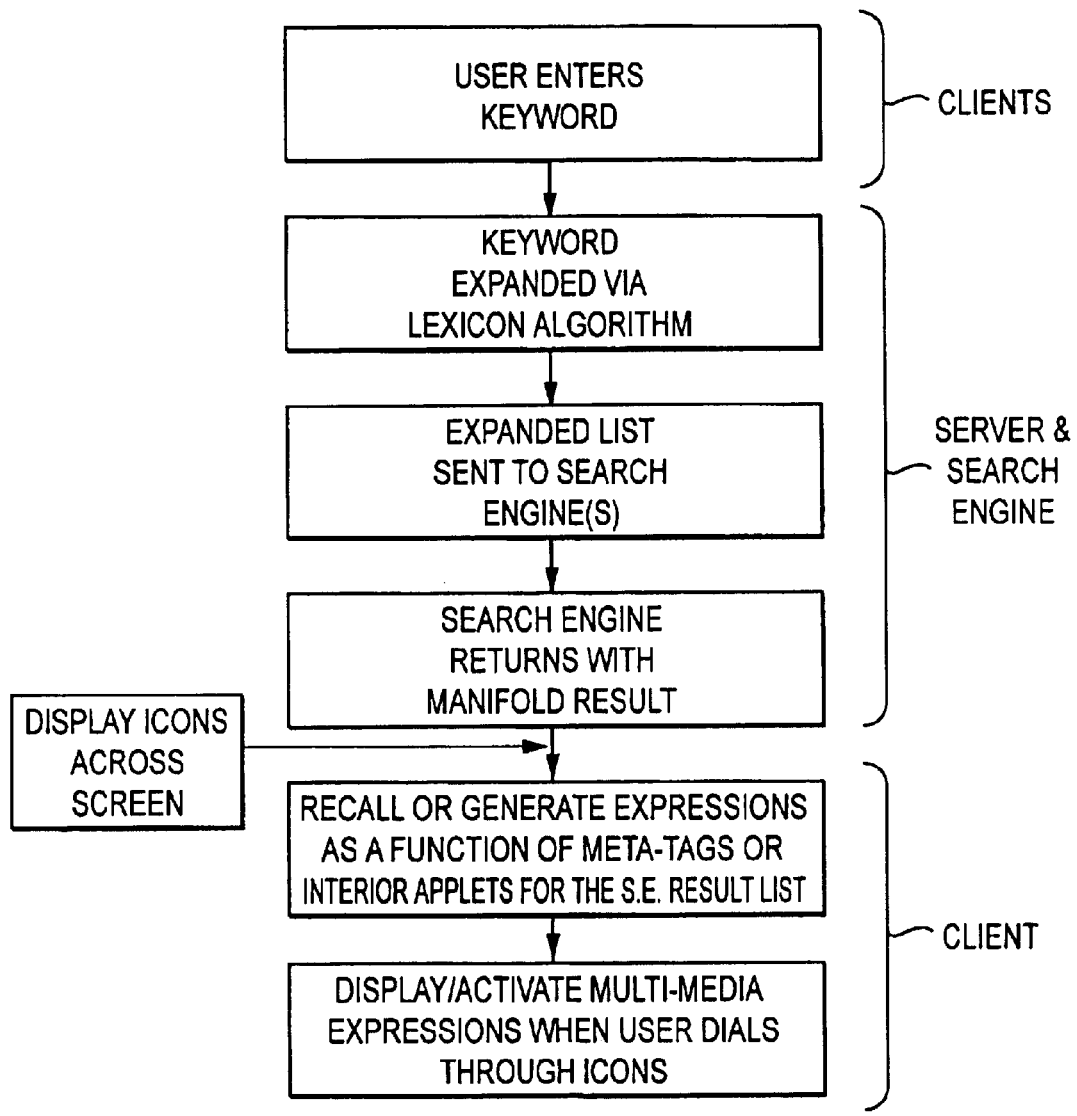
FIG. 13 illustrates the flow diagram for an "expended keyword searching" method of Internet navigation.

A similar flow diagram for an "expanded keyword searching" method is shown in FIG. 13 and is seen to comprise the steps of (a) generating a plurality of related keywords in response to a user-inputted keyword, (b) inputting this plurality of related keywords to a search engine for identification and retrieval from the search engine's database of characterizing information for those web pages having indexed information which matches with the inputted keywords, (c) generating, utilizing the retrieved information, multi-media expressions for each of the matched web pages, (d) generating and displaying, utilizing the retrieved information, a plurality of icons, each of which is representative of one of the matched web pages, and (e) communicating at least one of the multimedia expressions to the user when the user selects a specific icon.

The foregoing descriptions of the invention-have been presented for purposes of illustration and description. Further, the description is not intended to limit the invention to the form disclosed herein. Consequently, variations and modifications commensurate with the above teachings, and combined with the skill or knowledge in the relevant art are within the scope of the present invention.

The preferred embodiments described herein are further intended to explain the best mode known of practicing the invention and to enable others skilled in the art to utilize the invention in various embodiments and with various modifications required by their particular applications or uses of the invention. It is intended that the appended claims be construed to include alternate embodiments to the extent permitted by the current art.

We claim:

1. In a computer having a processor, an operating system, a graphical user interface and a browser and connected to a network having a search engine server, the improvement comprising:

means for generating a plurality of IP addresses based upon an initial, user-inputted IP address, means for directing the retrieval from a network server of stored, indexed information pertaining to said IP addresses, means, utilizing said retrieved information, for generating multi-media expressions for each of said IP addresses, and means, utilizing said retrieved information, for generating and displaying a plurality of icons, each of which is representative of one of said IP addresses.

2. In a computer as recited in claim 1, the improvement further comprising:

means for communicating at least one of said multimedia expressions to the user when said user selects a specific said icon.

3. In a computer as recited in claim 2, the improvement further comprising:

an I/O controller that enables a user to select a specific icon for the communication of at least one of said multimedia expressions related to said user selected icon.

4. A computer program product for providing a user with the capability to navigate the Internet by inputting an initial IP address, wherein said Internet comprising a plurality of web pages and a search engine server having indexed information pertaining to said web pages and the IP addresses of said web pages, said computer program product comprising:

code that generates a plurality of IP addresses based upon said initial, user-inputted IP address, code that directs the retrieval from said search engine server of said indexed information pertaining to each of said generated IP addresses, code that generates, utilizing said retrieved information, multi-media expressions for each of said generated IP addresses, code that generates and displays, utilizing said retrieved information, a plurality of icons, each of which is representative of one of said generated IP addresses, and code that communicates at least one of said multimedia expressions to the user when said user selects a specific said icon.

5. The computer program product of claim 4, further comprising:

code that operates an I/O controller to enable a user to select a specific icon for the communication of at least one of said multimedia expressions related to said user selected icon.

6. A method for enabling a computer user to navigate the Internet by inputting an initial IP address, wherein said Internet comprising a plurality of web pages and a search engine server having indexed information pertaining to said web pages and the IP addresses of said web pages, said method comprising the steps of:

generating a plurality of IP addresses based upon said initial, user-inputted IP address, directing the retrieval from said search engine server of said indexed information pertaining to each of said generated IP addresses, generating, utilizing said retrieved information, multimedia expressions for each of said generated IP addresses, generating and displaying, utilizing said retrieved information, a plurality of icons, each of which is representative of one of said generated IP addresses, and communicating at least one of said multimedia expressions to the user when said user selects a specific said icon.

7. The method of claim 6, further comprising the step of:

utilizing an I/O controller to enable a user to select a specific icon for the communication of at least one of said multimedia expressions related to said user selected icon.

* * * * *